(12) United States Patent
Morillon et al.

(10) Patent No.: US 6,522,027 B1
(45) Date of Patent: Feb. 18, 2003

(54) "HANDS-FREE" ACCESS AND/OR ENGINE STARTING SYSTEM FOR AUTOMOBILE VEHICLES

(75) Inventors: Jacques Morillon, Massy (FR); Xavier Baudard, Paris (FR)

(73) Assignee: Valeo Securite Habitacle, Creteil (FR)

( * ) Notice: Subject to any disclaimer, the term of this patent is extended or adjusted under 35 U.S.C. 154(b) by 143 days.

(21) Appl. No.: 09/709,511

(22) Filed: Nov. 13, 2000

(30) Foreign Application Priority Data

Nov. 10, 1999 (FR) .............................. 99 14107
Feb. 9, 2000 (FR) .............................. 00 01564

(51) Int. Cl.[7] .............................................. E05B 17/00
(52) U.S. Cl. ...................... 307/10.3; 307/9.1; 307/10.1; 307/10.2; 307/10.6; 340/825.31
(58) Field of Search .................. 307/10.3, 9.1, 307/10.1, 10.6, 10.2; 340/325.31

(56) References Cited

U.S. PATENT DOCUMENTS

| 5,600,323 | A |  | 2/1997 | Boschini |  |
| 5,602,535 | A | * | 2/1997 | Boyles et al. | 340/825.31 |
| 5,929,769 | A | * | 7/1999 | Garnault | 340/825.31 |
| 6,218,932 | B1 | * | 4/2001 | Stippler | 340/426 |

FOREIGN PATENT DOCUMENTS

| DE | 19736302 | 4/1998 |
| EP | 0629759 | 12/1994 |
| EP | 0833026 | 4/1998 |
| FR | 2749607 | 12/1997 |

* cited by examiner

Primary Examiner—Stephen W. Jackson
Assistant Examiner—Robert L Deberadinis
(74) Attorney, Agent, or Firm—Liniak, Berenato & White

(57) ABSTRACT

The disclosure relates to an authentication device for automobile vehicles that controls door locking and/or engine starting and is able to interchange data over a certain distance with an identifier, intended to be carried by a user, when said identifier lies within the emission/reception coverage zone of said authentication device, to enable "hands-free" vehicle access and/or engine starting when said identifier has been authenticated by said authentication device, wherein said authentication device is connected to a single antenna inside the vehicle passenger compartment and is able to emit via said antenna at least two distinct emission powers, a first emission power enabling said antenna to cover a first zone including at least part of said passenger compartment, and a second emission power greater than said first emission power enabling said antenna to cover a second zone including at least the whole of said passenger compartment and possibly a coverage zone outside said vehicle.

14 Claims, 2 Drawing Sheets

"HANDS-FREE" ACCESS AND/OR ENGINE STARTING SYSTEM FOR AUTOMOBILE VEHICLES

BACKGROUND OF THE INVENTION

The present invention concerns a so-called "hands-free" access and/or engine starting system for automobile vehicles.

More particularly, the invention is a "hands-free" access and/or engine starting system making use of an inside antenna.

DESCRIPTION OF THE PRIOR ART

In so-called "hands-free" access systems for automobile vehicles, an identification or authentication device is installed on the vehicle to control the vehicle's door locking means, this authentication device being able to interchange data over a certain distance with at least one identification device (hereinafter called an "identifier") carried by a user, to enable access to the vehicle when the identifier has been identified by the authentication device. To enable the dialog between the authentication device and the identifier and thereby detection of the presence of an identifier outside the vehicle, several antennas are generally mounted around the vehicle. Such antennas are fitted, for example, in rear-view mirrors, door handles, and door pillars. When the user locks the vehicle, for example by pressing on a specific button on the outside door handle, then moves away from the vehicle, the system assures automatic locking of the vehicle doors as soon as the identifier carried by the user exits the coverage zone of the outside antennas and become undetectable.

In addition, when a driver carrying an authorized identifier is inside the passenger compartment, such a system can also inhibit anti-starting devices, such as an electronic immobilizer, to enable starting of the vehicle's engine. The authentication device can emit an identification signal via antennas mounted inside the vehicle to detect the identifier inside the vehicle. These antennas are fitted for example in the dashboard, seats or inside door panels.

However, a large number of antennas may be required, increasing material costs and vehicle assembly time.

Prior to hands-free external door locking, inside antennas can also be used to check for the presence of identifiers in the vehicle, to avoid locking a person or identifier in the car.

When the inside antennas are used for identification prior to engine starting, the identification signal emitted by the antennas must not propagate outside the vehicle, to ensure that the immobilization system is inhibited only if an authorized driver is in the car. This avoids the risk of accidental engine starting, for example when a child playing in the car operates the starter contactor while the driver carrying the identifier is standing outside the vehicle. To ensure that the detection zone does not extend beyond the passenger compartment, several antennas are necessary with deliberately restricted ranges to cover only the whole of the compartment.

SUMMARY OF THE INVENTION

The object of the invention it to overcome the disadvantages described previously and propose a "hands-free" access system requiring fewer antennas, yet providing adequate coverage of the passenger compartment and the vehicle's external environment.

For this purpose, the invention is an authentication device for automobile vehicles that controls door locking and/or engine starting and is able to interchange data over a certain distance with an identifier, intended to be carried by a user, when said identifier lies within the emission/reception coverage zone of said authentication device, to enable "hands-free" vehicle access and/or engine starting when said identifier has been authenticated by said authentication device, wherein said authentication device is connected to a single antenna inside the vehicle passenger compartment and is able to emit via said antenna at least two distinct emission powers, a first emission power enabling said antenna to cover a first zone including at least part of said passenger compartment, and a second emission power greater than said first emission power enabling said antenna to cover a second zone including at least the whole of said passenger compartment and possibly a coverage zone outside said vehicle.

In a first embodiment of the invention, the authentication device emits via said antenna at a first emission power enabling the antenna to cover a first zone substantially limited to the inside of said passenger compartment, or at a second emission power greater than said first emission power enabling the antenna to cover a second zone extending beyond the first zone and including a coverage zone outside said vehicle to enable "hands-free" access.

One particularity of the invention is that the authentication device is able to trigger, in response to user activation of an external system of the vehicle, an identification data interchange at said first emission power to detect the possible presence of an authorized identifier inside the vehicle, prior to authorizing vehicle door locking.

In a second embodiment, the authentication device emits via said antenna at a first emission power enabling the antenna to cover a first zone covering only part, preferably the major part, of said passenger compartment, or at a second emission power greater than said first emission power enabling the antenna to cover a second zone including the whole of said passenger compartment and a zone outside the vehicle and adjacent to it, without however extending over the whole of said coverage zone enabling "hands-free" access.

In a variant of the second embodiment, the authentication device is able to emit via the inside antenna at three distinct emission powers, the third emission power being greater than said second emission power and enabling said antenna to cover a third zone which extends outside the vehicle and constitutes said coverage zone outside said vehicle enabling "hands-free" access.

One particularity of the invention is that the authentication device is able to trigger, in response to user activation of an external system of the vehicle, an identification data interchange at said second emission power to detect the possible presence of an authorized identifier inside the vehicle, prior to authorizing vehicle door locking.

Another characteristic of the invention is that the authentication device is able to trigger, in response to user activation of an external system of the vehicle, an identification data interchange at an emission power sufficient to detect the possible presence of an authorized identifier in said coverage zone outside said vehicle enabling "hands-free" access. Said external system is preferably the outside door handle or an outside contactor.

Advantageously, the location of the single antenna in said passenger compartment and the value of the emission power providing said coverage zone outside the vehicle are such that the antenna radiation is not blocked by metal barriers and/or vehicle door windows, but radiates outside said vehicle to cover said coverage zone.

Advantageously, the emission power assuring of said zone outside said vehicle to enable "hands-free" access is such that the radiation reaches about 2 meters outside the vehicle.

Another characteristic of the invention is that the authentication device is able to trigger, in response to user activation of an engine starting contactor in said passenger compartment, an identification data interchange at said first emission power to detect the possible presence of an authorized identifier inside said passenger compartment, prior to permitting "hands-free" engine starting.

The emission of the interrogation signal by the authentication device via the single antenna at the first emission power is preferably at low frequency, for example about 125 kHz.

The single antenna can take the form of a loop inside said passenger compartment.

BRIEF DESCRIPTION OF THE DRAWINGS

The invention will be better understood and other details, characteristics and advantages will become clear on reading the following detailed description two preferred embodiments, taken only as non-limitative examples, making reference to the attached drawings of which.

DETAILED DESCRIPTION OF PREFERRED EMBODIMENTS

Figure 1:
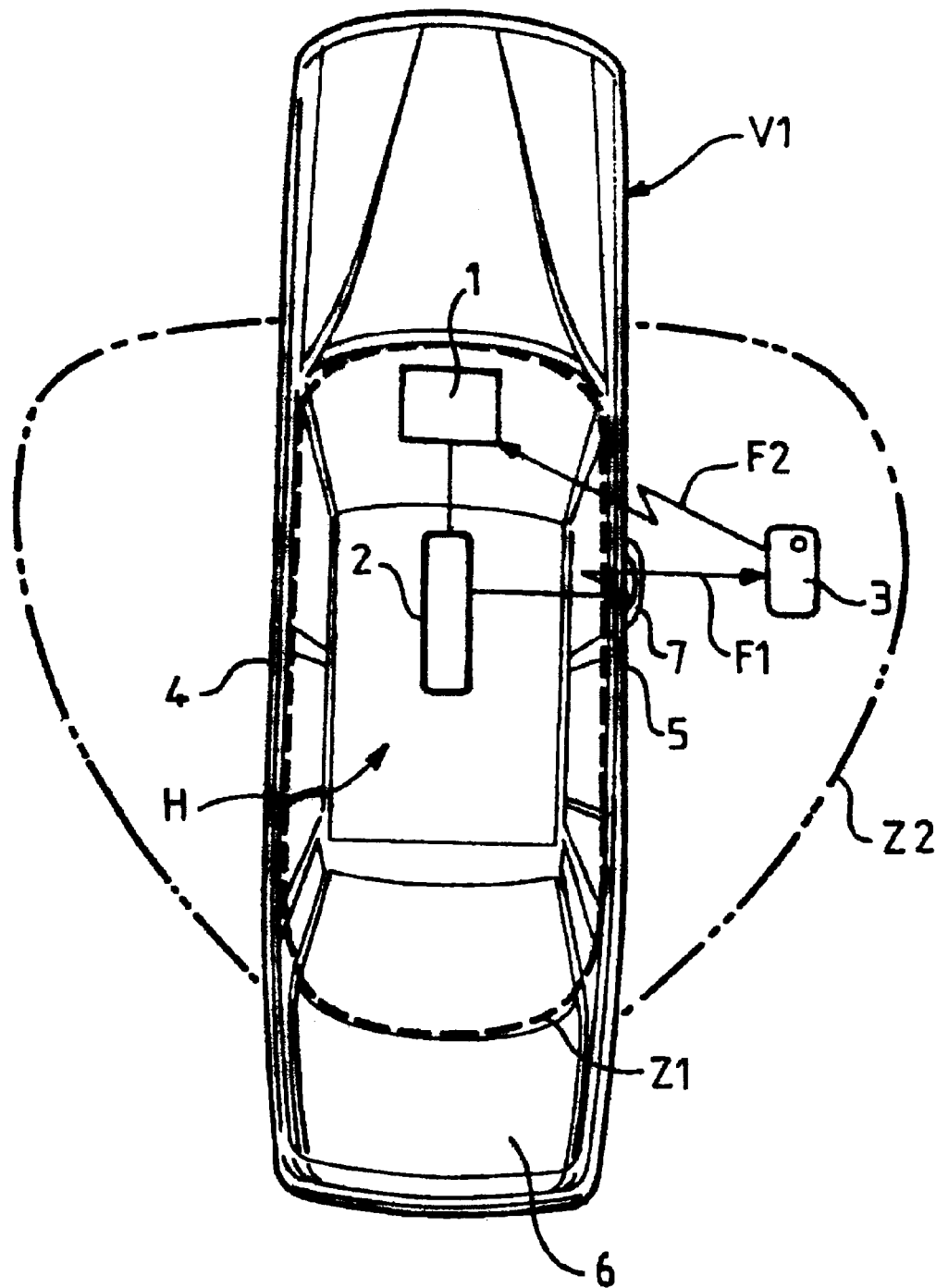
FIG. 1 represents a view from above of a vehicle equipped according to a first embodiment of the invention.

FIG. 1 shows an automobile vehicle V1 equipped with a main electronic management unit 1 incorporating an authentication device according to a first embodiment of the invention. This unit 1 is connected to a single antenna 2 mounted inside the vehicle passenger compartment H; this antenna 2 is loop shaped, for example. The authentication means preferably include a low frequency transmitter and a radiofrequency receiver to enable data interchange over a certain distance with one or more identifiers, for example an identifier 3. The zigzag arrow F1 in the figure represents the emission of a low frequency signal by the antenna 2 to an identifier 3 outside the vehicle V1; the zigzag arrow F2 represents the emission of the radiofrequency response signal from the identifier 3 to the electronic unit 1.

The electronic unit 1 is able to control the locking of the vehicle's side doors 4, 5 and trunk lid 6. In the figure, the side door 5 has an outside door handle 7 which can be equipped with a contactor provided specifically to signal a user locking or unlocking command to the electronic unit 1. Similarly, another specific contactor (not shown) on the vehicle dashboard can be provided to send an engine starting command to the electronic unit 1.

The operation of the invention will now be briefly explained.

When a user equipped with an authorized identifier 3 approaches the vehicle and pulls on the handle 7, the electronic unit 1 is awakened and sends via the single antenna 2 an interrogation signal to the identifier 3, as represented by the arrow F1. This interrogation signal is emitted at a second power higher than the first to provide coverage of a zone Z2 including the whole vehicle passenger compartment H and a zone outside, adjacent to the doors 4, 5. The power of this signal is sufficient to enable to the electromagnetic field to traverse the metal barriers and/or door windows 4, 5 and, advantageously, enable the magnetic field (radiation) to reach about 2 meters outside the vehicle. If the identifier 3 lies in the coverage zone Z2, it is awakened and responds by sending a radiofrequency signal, represented by the arrow F2, to the electronic unit 1. If the identifier is authenticated, the electronic unit 1 then unlocks the doors 4, 5 and the trunk lid 6.

When the user gets into the car to drive, he operates a starting contactor which causes emission by the electronic unit 1 via the antenna 2 of another interrogation signal at a lower emission power, such that the electromagnetic radiation from the antenna 2 extends over a different coverage zone Z1 substantially limited to the inside of the passenger compartment H. If the authorized identifier is detected in the passenger compartment H and this identifier is authorized to start the engine, the central unit 1 then automatically starts the engine.

The electronic unit 1 can be equipped with a switch able to switch between two distinct emission powers, depending on whether the detection is to be made inside or outside the vehicle.

Figure 2:
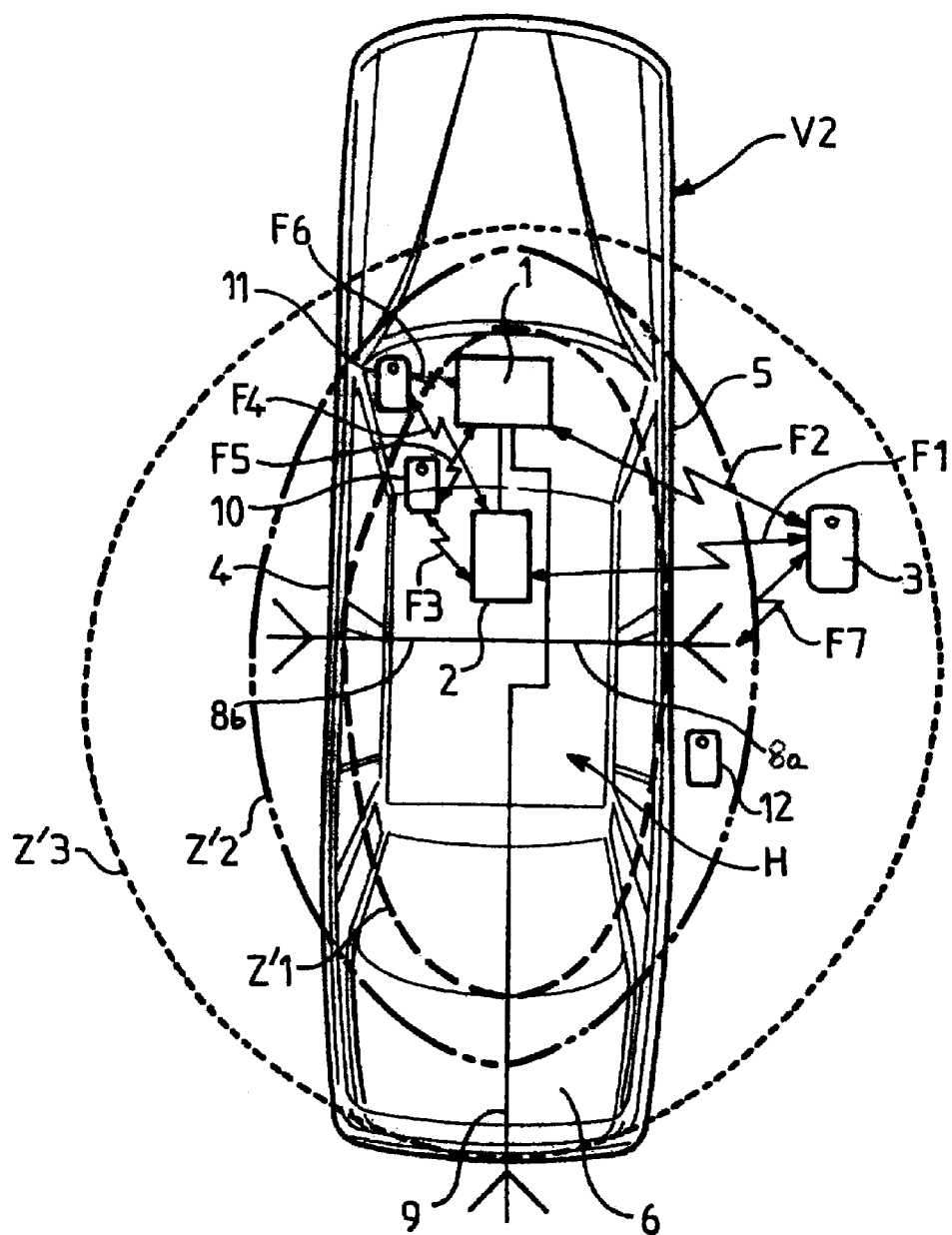
FIG. 2 represents a view from above of a vehicle equipped according to a second embodiment of the invention.

FIG. 2 shows an automobile vehicle V2 equipped with an authentication device according to a second embodiment of the invention; parts common to the first and second embodiments carry the same reference numbers in FIGS. 1 and 2.

The vehicle is equipped with a main electronic management unit 1 that incorporates an authentication device and is connected to a single antenna 2 mounted inside the vehicle passenger compartment H; this antenna 2 is loop shaped, for example. In this second embodiment of the invention, this inside antenna 2 emits interrogation signals to enable control of door locking or unlocking, or engine starting.

The authentication means preferably include a low frequency transmitter and a radiofrequency receiver to enable data interchange via the inside antenna 2 over a certain distance with one or more identifiers, for example an identifier 3. The zigzag arrow F1 represents the emission of a low frequency signal from the inside antenna 2 to an identifier 3 located outside the vehicle V2 in a zone Z'3. The zigzag arrow F2 represents the radiofrequency response signal from the external identifier 3 to the electronic unit 1. The zigzag arrow F3 represents the emission of a low frequency signal from the inside antenna 2 to an identifier 10 located inside the passenger compartment H in a zone Z'1. The zigzag arrow F4 represents the emission of a low frequency signal from the inside antenna 2 to an identifier 11 located inside the passenger compartment in a zone Z'2. The zigzag arrows F5, F6 represent respectively the radiofrequency response signals from the identifiers 10, 11 in the vehicle to the electronic unit 1.

The electronic unit 1 is able to control the locking of the vehicle's side doors 4, 5 and trunk lid 6. The system includes a specific contactor (not shown), for example on the outside handle of the vehicle, to signal a user locking or unlocking command to the electronic unit 1. The system can also include another specific contactor (not shown) on the vehicle dashboard to signal a user's engine starting command to the electronic unit 1.

The operation of this second embodiment of the invention will now be briefly explained.

When a user equipped with an authorized identifier 3 approaches the vehicle and pulls on the handle, the electronic unit 1 is awakened and sends via the single antenna 2 an interrogation signal to the identifier 3, represented by the arrow F1. This interrogation signal is emitted at a third power providing a coverage zone Z'3 including the whole vehicle passenger compartment H and extending outside the vehicle to cover a zone adjacent to the doors 4, 5. The power of this signal corresponds for example to the power defined previously in the first embodiment to create the zone Z2. By way of example, the power is such that the magnetic field (radiation) reaches about 2 meters outside the vehicle. If the identifier 3 lies in the coverage zone Z'3, it is awakened and responds by sending a radiofrequency signal, represented by the arrow F2, to the electronic unit 1. If the identifier is authenticated, the electronic unit 1 then unlocks the doors 4, 5 and the trunk lid .6.

When the user gets into the car to drive, he operates a specific starting contactor which causes emission by the electronic unit 1 via the single inside antenna 2 of an interrogation signal, represented by the arrow F3, at a first emission power, such that the electromagnetic radiation from the antenna 2 extends over a coverage (or detection) zone Z'1 limited to the inside of the passenger compartment H. This zone covers a large part of the passenger compartment but does not extend outside the vehicle. This emission power is determined such that an identifier outside the vehicle, such as the identifier 12, cannot be detected. If a response signal, represented by the arrow F5, of the identifier 10 is detected in the passenger compartment H and this identifier is authorized to start the engine, the electronic unit 1 then automatically starts the engine.

When the user leaves the vehicle, he operates the specific contactor of the outside handle of the vehicle which causes emission by the electronic unit 1 via the inside antenna 2 of an interrogation signal. This interrogation signal is emitted first at a second emission power corresponding to the coverage zone Z'2 to verify the absence of an identifier in the passenger compartment H, then at a third power to verify the absence of an identifier in the zone Z'3 and control the door locking. If the electronic unit detects the presence of an identifier in the passenger compartment, in other words in the zone Z'2, the system could memorize the identity of this identifier left (possibly deliberately) in the vehicle. The system could then trigger the locking of the vehicle when it detects no presence of an identifier in the zone Z'3, other than this one left in the vehicle.

This second embodiment of the invention shown in FIG. 2 therefore enables an outside identifier 12 not to be detected during an engine starting command, while enabling reliable detection of all identifiers (such as 11) inside the vehicle during a locking command.

The electronic unit 1 can be equipped with a switch able to switch between two distinct emission powers, depending on whether the detection is to be made for an engine starting command or for a locking command.

In a variant of this second embodiment, the automobile vehicle V2 is equipped with a main electronic management unit 1 that incorporates an authentication device and is connected to a series of antennas. This electronic unit 1 is connected to an antenna 2 mounted the vehicle passenger compartment H; this antenna 2 is loop shaped, for example. The electronic unit 1 is also connected to antennas 8a, 8b and 9 outside the passenger compartment H. The antennas 8a, 8b are mounted for example in the handles of side doors 4, 5 of the vehicle V2. The antenna 9 extends to the rear of the vehicle and is mounted substantially at the level of the trunk lid 6.

The authentication means preferably also include a low frequency transmitter and a radiofrequency receiver to enable data interchange over a certain distance with one or more identifiers, for example an identifier 3. The zigzag arrow F7 represents the emission of a low frequency signal from the outside antenna 8a to an identifier 3 located outside the vehicle V2. The zigzag arrow F2 represents the radiofrequency response signal from the external identifier 3 to the electronic unit 1. The zigzag arrows F3 and F5 represent the data interchange between an identifier 10 and the electronic unit 1 via the inside antenna 2 when the identifier 10 is within the zone Z'1. The zigzag arrows F4 and F6 represent the data interchange between an identifier 11 and the electronic unit 1 via the inside antenna 2 when the identifier 11 is within the zone Z'2.

The operation of this variant of the second embodiment of the invention will now be briefly explained.

When a user equipped with an authorized identifier 3 approaches the vehicle and pulls on the handle, the electronic unit 1 is awakened and sends via the outside antennas 8a, 8b an interrogation signal, represented by the arrow F7, to the identifier 3. If the identifier 3 lies in the coverage zone of the outside antennas, it is awakened and responds by sending a radiofrequency signal, represented by the arrow F2, to the electronic unit 1. If the identifier is authenticated, the electronic unit 1 then unlocks the doors 4, 5 and the trunk lid 6. The system can therefore emit interrogation signals at three distinct powers corresponding to the three coverage zones Z'1, Z'2 and Z'3. The first power corresponds to the first zone Z'1 used to control engine starting. The third power corresponding to the zone Z'3 is used to control door unlocking and is also used in combination with the second power to control door locking, in order to be able to warn the user of the possible presence of an identifier in the passenger compartment. When the user leaves the vehicle, he operates the specific contactor on the outside handle of the vehicle which causes emission by the electronic unit 1 via the inside antenna 2 of an interrogation signal F4, at a second emission power such that the electromagnetic radiation from the antenna 2 extends over another coverage zone Z'2 larger than the zone Z'1 mentioned previously. This second emission power is determined such as to be certain that an identifier inside the passenger compartment can be detected—even if this means that the detection zone Z'2 extends slightly outside the vehicle. If no identifier is detected inside the passenger compartment, the system locks the doors as soon as the identifier carried by the user leaves the coverage zone of the outside antennas. The use of a second power for the emission of the interrogation signal therefore ensures that an identifier inside the vehicle (such as the identifier 11) will be detected, since the identifier will emit a response signal F6, whereas this identifier would not have been detected by an interrogation signal emitted at a first power, as defined previously, corresponding to the smaller detection zone Z'1

What is claimed is:

1. Authentication device (1) for automobile vehicles (V1, V2) that controls door locking and/or engine starting and is able to interchange data over a certain distance with an identifier (3, 10–12), intended to be carried by a user, when said identifier lies within the emission/reception coverage zone of said authentication device, to enable control of a requested function including "hands-free" vehicle access and/or engine starting by corresponding determined actions of a user on the vehicle, when said identifier has been authenticated by said authentication device, wherein said authentication device (1) is connected to a single antenna (2) inside the vehicle passenger compartment (H) and is able to emit via said antenna at least two distinct emission powers, a first emission power enabling said antenna to cover a first zone (Z1, Z'1) including at least part of said passenger compartment (H), and a second emission power greater than said first emission power enabling said antenna to cover a second zone (Z2, Z'2) including at least the whole of said passenger compartment and a coverage zone outside said vehicle, for proximity detection of the identifier by interrogation of a location of the identifier in or outside specific zones according to said user's requested function and checking if the location of the identifier allows the requested function.

2. Authentication device according to claim 1, characterized in that it can emit via said inside antenna (2) at a first emission power enabling said antenna to cover a first zone (Z1) substantially limited to the inside of said passenger compartment (H) of a vehicle (V1), or at a second emission power greater than said first emission power enabling said antenna to cover a second zone (Z2) extending beyond said first zone to include a coverage zone outside said vehicle to enable "hands-free" access.

3. Authentication device according to claim 2, characterized in that it is able to trigger, in response to user activation of an external system (7) of said vehicle (V1), an identification data interchange at said first emission power to detect the possible presence of an authorized identifier (11) inside the vehicle, prior to permitting vehicle door locking.

4. Authentication device according to claim 2, characterized in that it is able to trigger, in response to user activation of an external system of the vehicle (V1, V2), an identification data interchange at an emission power sufficient to detect the possible presence of an authorized identifier (3) in said coverage zone outside said vehicle enabling "hands-free" access.

5. Authentication device according to claim 4, wherein the positioning of said single antenna (2) in said passenger compartment (H) and the value of the emission power assuring said coverage zone (Z2, Z'3) extending outside said vehicle are determined such that the antenna radiation is not blocked by metal barriers and/or door windows of said vehicle (V1, V2) but radiates outside said vehicle to cover said coverage zone (Z2, Z'3).

6. Authentication device according to claim 5, wherein said emission power assuring coverage of said zone (Z2, Z'3) outside said vehicle to enable "hands-free" access is such that the radiation reaches about 2 meters outside said vehicle.

7. Authentication device according to claim 1, characterized in that it can emit via said inside antenna (2) at a first emission power enabling said antenna to cover a first zone (Z'1) extending over only part, preferably a major part, of said passenger compartment (H) of a vehicle (V2), or at a second emission power greater than said first emission power enabling said antenna to cover a second zone (Z'2) including the whole of said passenger compartment and a zone outside said vehicle and adjacent to it, without however extending over the whole of said coverage zone outside said vehicle enabling "hands-free" access.

8. Authentication device according to claim 7, characterized in that it can emit via said inside antenna (2) at three distinct emission powers, the third emission power being greater than said second emission power and enabling said antenna to cover a third zone (Z'3) which extends outside said vehicle and constitutes said coverage zone outside said vehicle enabling "hands-free" access.

9. Authentication device according to claim 7, characterized in that it can emit via at least two outside antennas (8a, 8b) at an emission power enabling these antennas to cover a third zone (Z'3) which extends outside said vehicle and constitutes said coverage zone outside said vehicle enabling "hands-free" access.

10. Authentication device according to claim 5, characterized in that it is able to trigger, in response to user activation of an external system of said vehicle (V2), an identification data interchange at said second emission power to detect the possible presence of an authorized identifier (11) inside the vehicle, prior to permitting vehicle door locking.

11. Authentication device according to claim 1, characterized in that it is able to trigger, in response to user operation of an engine starting contactor in said passenger compartment (H), an identification data interchange at said first emission power to detect the possible presence of an authorized identifier inside said passenger compartment (H) prior to permitting "hands-free" engine starting.

12. Authentication device according to claim 1, characterized in that it emits an interrogation signal via said single antenna (2) at said first emission power and at low frequency for example about 125 kHz.

13. Authentication device according to claim 1, wherein said single antenna (2) is in the form of a loop inside said passenger compartment (H).

14. Automobile vehicle (V1, V2) incorporating an authentication device according to claim 1 to control door locking means and/or an immobilization system.

* * * * *